(12) United States Patent
Akselrod et al.

(10) Patent No.: US 10,397,320 B2
(45) Date of Patent: Aug. 27, 2019

(54) LOCATION BASED SYNCHRONIZED AUGMENTED REALITY STREAMING

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 15/001,431

(22) Filed: Jan. 20, 2016

(65) Prior Publication Data
US 2017/0208109 A1    Jul. 20, 2017

(51) Int. Cl.
*H04L 29/06* (2006.01)
*H04L 29/08* (2006.01)
*G06T 19/00* (2011.01)

(52) U.S. Cl.
CPC ........ *H04L 67/1095* (2013.01); *G06T 19/006* (2013.01); *H04L 65/602* (2013.01); *H04L 67/04* (2013.01); *H04L 67/18* (2013.01); *H04L 67/38* (2013.01); *H04L 67/42* (2013.01)

(58) Field of Classification Search
CPC ....................................................... H04L 67/38
USPC ........................................................ 709/219
See application file for complete search history.

(56) References Cited

U.S. PATENT DOCUMENTS

| 4,255,814 | A | 3/1981 | Osborn |
| 8,493,353 | B2 | 7/2013 | Blanchflower et al. |
| 9,142,062 | B2 | 9/2015 | Maciocci et al. |
| 2011/0164163 | A1 | 7/2011 | Bilbrey et al. |
| 2012/0069131 | A1* | 3/2012 | Abelow ............... G06Q 10/067 348/14.01 |
| 2014/0267404 | A1 | 9/2014 | Mitchell et al. |
| 2014/0306866 | A1* | 10/2014 | Miller .................. G06T 19/006 345/8 |

FOREIGN PATENT DOCUMENTS

WO        0205904 A1    1/2002

OTHER PUBLICATIONS

Meiguins et al., "Coordinated and Multiple Data Views in Augmented Reality Environment", Source: Augmented Reality, Book edited by: Soha Maad, ISBN 978-953-7619-69-5, pp. 230, Jan. 2010, INTECH, Croatia, downloaded from sciyo.com.

(Continued)

*Primary Examiner* — Vivek Srivastava
*Assistant Examiner* — Sibte H Bukhari
(74) *Attorney, Agent, or Firm* — Christopher K. McLane; Maeve L. McCarthy

(57) ABSTRACT

In an approach to location based augmented reality broadcasting, one or more computer processors determine a location of the one or more computing devices. The one or more computer processors determine whether two or more of the one or more computing devices are in the same location. In response to determining whether two or more of the one or more computing devices are in the same location, the one or more computer processors upload a first synchronized augmented reality data stream to the two or more computing devices in the same location.

17 Claims, 3 Drawing Sheets

(56) References Cited

OTHER PUBLICATIONS

"Will hololens allow multiple users to view same thing??", Windows Central Forums, Printed on Oct. 16, 2015 10:46 AM, 7 pages, <http://forums.windowscentral.com/microsoft-hololens/335721-will-hololens-allow-multiple-users-view-same-thing.html>.

* cited by examiner

LOCATION BASED SYNCHRONIZED AUGMENTED REALITY STREAMING

BACKGROUND OF THE INVENTION

The present invention relates generally to the field of augmented reality, and more particularly to broadcasting a synchronized augmented reality data stream based on users' location.

Augmented reality comprises an area of known endeavor. Generally speaking, augmented reality comprises a live, direct (or indirect) view of a physical, real world environment having contents that are augmented, or supplemented, by computer-generated sensory input such as visually-perceivable content. In many cases the augmented reality system aligns the overlaid imagery with specific elements of the physical world. Some augmented reality approaches rely, at least in part, upon a head-mounted display. These head-mounted displays often have the form-factor of a pair of glasses. Such displays place contrived images over a portion, though typically not all of, a user's view of the world. Such head-mounted displays are typically either optical see-through mechanisms or video-based mechanisms.

Augmented reality glasses may provide an enhanced view of the real world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

SUMMARY

Embodiments of the present invention disclose a method, a computer program product, and a system for location based augmented reality broadcasting. The method may include one or more computer processors determining a location of the one or more computing devices. The one or more computer processors determine whether two or more of the one or more computing devices are in the same location. In response to determining whether two or more of the one or more computing devices are in the same location, the one or more computer processors upload a first synchronized augmented reality data stream to the two or more computing devices in the same location.

DETAILED DESCRIPTION

As augmented reality devices begin to permeate society, some users may utilize the technology to decorate living spaces. For example, a building owner can portray a wall as if the wall is painted a particular color, or is covered in a particular wallpaper, or displaying a virtual television with a live stream. In such a situation, the building owner may want to ensure that for multiple augmented reality device users in the same place, each user sees the same thing at the same time, such that if the augmented reality data stream includes an animated figure in a specific location of the building, all the augmented reality device users in that location will view the same animated figure at the same time. Embodiments of the present invention recognize that an augmented reality experience may be enhanced by providing consistent and collaborative viewing by a plurality of users based on the users' location. Implementation of embodiments of the invention may take a variety of forms, and exemplary implementation details are discussed subsequently with reference to the Figures.

Figure 1:
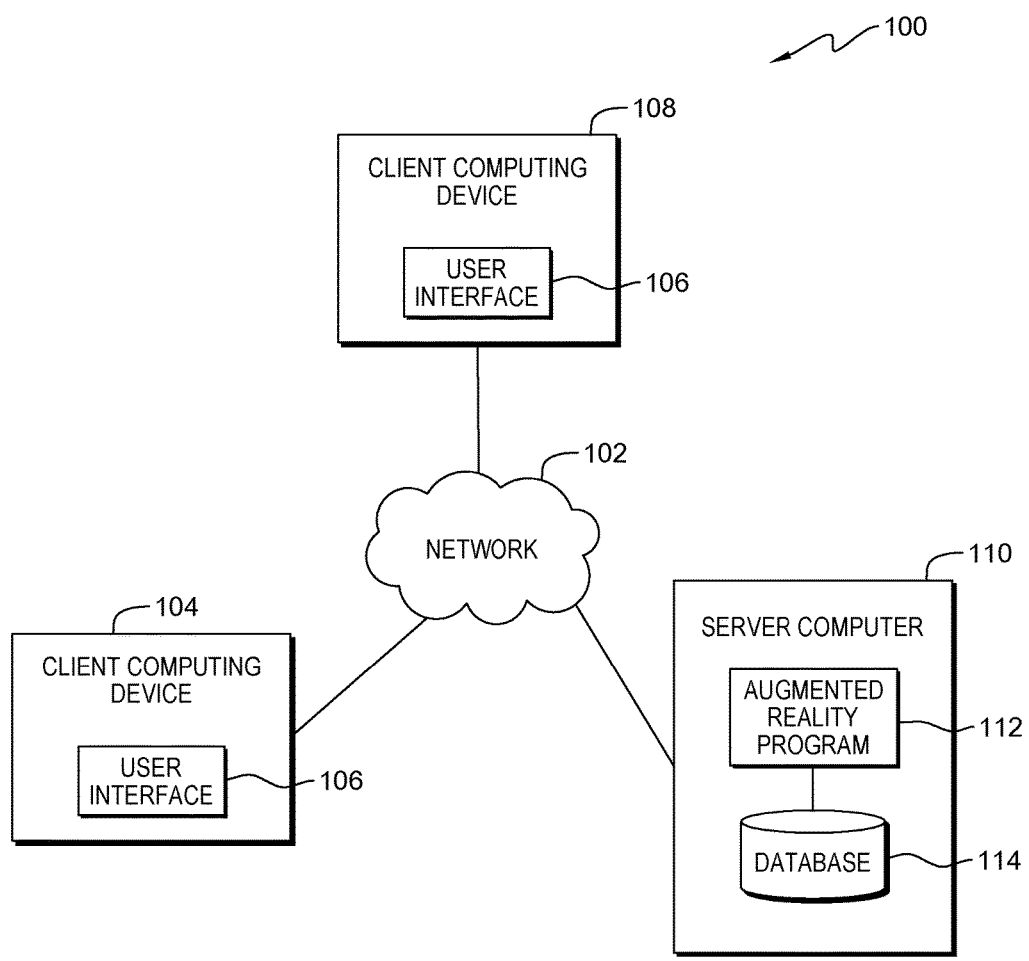
FIG. 1 is a functional block diagram illustrating an augmented reality data processing environment, in accordance with an embodiment of the present invention.

FIG. 1 is a functional block diagram illustrating an augmented reality data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Augmented reality data processing environment 100 includes client computing device 104, client computing device 108, and server computer 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, client computing device 108, server computer 110, and other computing devices (not shown) within augmented reality data processing environment 100.

Client computing device 104 and client computing device 108 can each be a laptop computer, a tablet computer, a smart phone, or any programmable electronic device capable of communicating with various components and devices within augmented reality data processing environment 100, via network 102, and displaying an augmented reality data stream. Client computing device 104 and client computing device 108 can each be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device 104 and client computing device 108 represent any programmable electronic device or combination of programmable electronic devices capable of executing machine readable program instructions and communicating with other computing devices (not shown) within augmented reality data processing environment 100 via a network, such as network 102. Client computing device 108 may represent more than one client computing device. Client computing device 104 and client computing device 108 each include an instance of user interface 106.

User interface 106 provides an interface for users of both client computing device 104 and client computing device 108 with server computer 110. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface for users of both client computing device 104 and client computing device 108 with server computer 110. Mobile application software, or an "app," is a computer program designed to run on smart phones, tablet computers and other mobile devices. User interface 106 enables client computing device 104 and client computing device 108 to provide a connection with server computer 110 to interact with augmented reality program 112.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with client computing device 104, client computing device 108, and other computing devices (not shown) within augmented reality data processing environment 100 via network 102. In another embodiment, server computer 110 represents a computing system utilizing clustered computers and components (e.g., database server computers, application server computers, etc.) that act as a single pool of seamless resources when accessed within augmented reality data processing environment 100. Server computer 110 includes augmented reality program 112 and database 114. Server computer 110 may include internal and external hardware components, as depicted and described in further detail with respect to FIG. 3.

Augmented reality program 112 provides synchronized augmented reality to a plurality of users based on each of the users' location. By streaming data based on location, augmented reality program 112 can utilize optimization techniques to ensure the data stream is not overwhelming to a receiving device. Augmented reality program 112 ensures a user receives the right priority of data based on location. Augmented reality program 112 broadcasts a proximity based signal as an advertisement of an augmented reality service. If one or more users accept the data stream from the broadcast, then augmented reality program 112 receives a registration notice from the one or more accepting users. Augmented reality program 112 determines a location of the devices of the one or more accepting users, and determines whether there is more than one user in the same location. If augmented reality program 112 determines there are two or more users in the same location, then augmented reality program 112 simulcasts the data stream to the devices in the same location, such that when augmented reality program 112 transmits, or uploads, an augmented reality data stream to the devices, users in the same location see the same augmented reality information at the same time. As the users of the devices move to different locations, augmented reality program 112 receives the new location and proceeds to upload location based augmented reality data streams to the devices. When augmented reality program 112 receives an exit notice from one or more users, augmented reality program 112 discontinues the data stream upload. Augmented reality program 112 is depicted and described in further detail with respect to FIG. 2.

In the depicted embodiment, database 114 resides on server computer 110. In another embodiment, database 114 may reside elsewhere within augmented reality data processing environment 100 provided augmented reality program 112 has access to database 114. A database is an organized collection of data. Database 114 can be implemented with any type of storage device capable of storing data and configuration files that can be accessed and utilized by server computer 110, such as a database server, a hard disk drive, or a flash memory. Database 114 stores augmented reality data which augmented reality program 112 streams to client computing device 104 and client computing device 108. Database 114 may also store location coordinates that correspond to the augmented reality data such that the data is associated with a particular geographic location.

Figure 2:
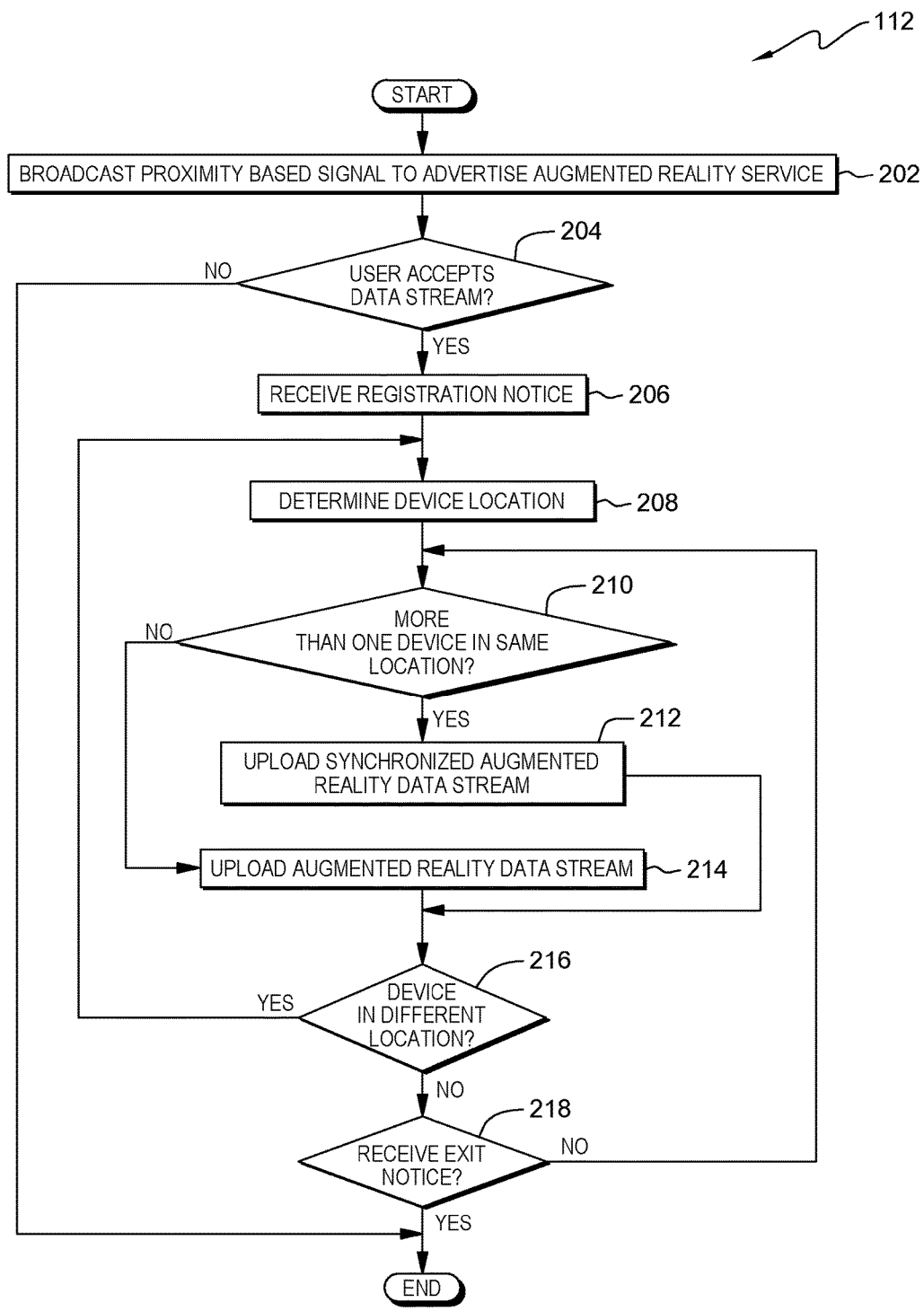
FIG. 2 is a flowchart depicting operational steps of an augmented reality program, on a server computer within the augmented reality data processing environment of FIG. 1, for providing synchronized augmented reality to a plurality of users based on location, in accordance with an embodiment of the present invention.

FIG. 2 is a flowchart depicting operational steps of augmented reality program 112, on server computer 110 within augmented reality data processing environment 100 of FIG. 1, for providing synchronized augmented reality to a plurality of users based on location, in accordance with an embodiment of the present invention.

Augmented reality program 112 broadcasts a proximity based signal to advertise an augmented reality service (step 202). Augmented reality program 112 utilizes one or more of a plurality of techniques known in the art to broadcast a signal to augmented reality devices, such as client computing device 104 and client computing device 108, alerting the devices that an augmented reality data stream is available in proximity to the location of the devices. For example, augmented reality program 112 may use technologies such as Bluetooth® or Wifi® to broadcast the signal. In one embodiment, augmented reality program 112 may constantly broadcast the signal in order to reach a device when the device is in proximity to the signal. In another embodiment, augmented reality program 112 may broadcast the signal when augmented reality program 112 detects a device is within a pre-defined proximity threshold. Augmented reality program 112 broadcasts the signal to one or more devices within a pre-defined geographic location. For example, the pre-defined geographic location may be a building or a room within a building. In another example, the pre-defined geographic location may be within a city block. In a further example, the pre-defined geographic location may be within a city. In one embodiment, as a user with an augmented reality enabled device, such as client computing device 104, enters a location where augmented reality program 112 is active, augmented reality program 112 may detect a signal from the device, indicating the device can receive an augmented reality data stream prior to broadcasting the signal. In another embodiment, if the user has previously subscribed to the augmented reality service, augmented reality program 112 may constantly search for registered devices prior to broadcasting the signal. In a further embodiment, client computing device 104 may constantly search for an augmented reality data service and, upon detecting augmented reality program 112, communicate a request, via user interface 106, for the augmented reality service to augmented reality program 112.

Augmented reality program 112 determines whether a user accepts a data stream (decision block 204). In one embodiment, after receiving the broadcasted signal, a user may choose whether or not to accept the signal and receive an augmented reality data stream. The user may accept the data stream via user interface 106. For example, augmented reality program 112 may display, via user interface 106, a prompt with "yes" and "no" checkboxes with which the user can choose to accept the augmented reality data stream. Augmented reality program 112 receives a response from the user and determines whether the user has accepted the data stream. In one embodiment, augmented reality program 112 determines whether more than one user accepts the data stream. If augmented reality program 112 determines a user does not accept the data stream ("no" branch, decision block 204), then augmented reality program 112 ends. For example, if the augmented reality service includes a fee for use, then the user may decide to opt out and decline the service. In another embodiment, augmented reality program 112 may not require user acceptance. For example, if a user is provided with a device upon entering a venue, such as a museum, then user acceptance can be inferred when the user turns on the device. In another example, if a user has subscribed to an augmented reality service in advance of arriving at a venue, then augmented reality program 112 may not require user acceptance at the time the user arrives.

If augmented reality program 112 determines a user accepts the data stream ("yes" branch, decision block 204), then augmented reality program 112 receives a registration notice (step 206). In one embodiment, augmented reality program 112 may require that a user register with augmented reality program 112 in order to receive an augmented reality data stream. For example, a user may need to register identification information corresponding to each device the user owns, such as make and model number, such that augmented reality program 112 can determine the specifications and capabilities of the device with regards to receiving an augmented reality data stream. In another example, a user may need to register identification information, such as name, address, and phone number. In yet another example, a user may need to register authentication information, such as a userid and password. In a further example, a user may need to provide payment information, such as a credit card number, if the augmented reality service includes a fee. In one embodiment, if the user has accepted the specific augmented reality service in the past, then registration may not be required. In another embodiment, a user may need to register each time the user accepts the augmented reality data stream. Augmented reality program 112 receives the registration notice from the user via user interface 106. In one embodiment, augmented reality program 112 may send a request for registration upon receiving acceptance of the data stream. In another embodiment, augmented reality program 112 may include a request for registration with the broadcasted signal in step 202.

Augmented reality program 112 determines a device location (step 208). In one embodiment, augmented reality program 112 may determine a device location by receiving coordinates or an address from one or more devices that accepted the augmented reality data stream. In another embodiment, augmented reality program 112 may determine a device location by detecting the location of the one or more devices via a global positioning system (GPS) included in the devices. In yet another embodiment, augmented reality program 112 may determine a device location by prompting the user of client computing device 104 or client computing device 108, via user interface 106, to input the user's current location. In a further embodiment, augmented reality program 112 may determine a device location via one of a plurality of indoor locating techniques known in the art, such as beacons and Wi-Fi® triangulation.

Augmented reality program 112 determines whether more than one device is in the same location (decision block 210). In one embodiment, augmented reality program 112 determines whether more than one device is in the same location by comparing the determined locations of the devices that accepted the augmented reality data stream to determine whether more than one device is within a pre-defined proximity threshold of one or more additional devices. For example, the pre-defined proximity threshold may require devices to be in the same room. In another example, the pre-defined proximity threshold may require devices to be within a particular distance of each other, such as fifteen feet. In a further example, the pre-defined proximity threshold may require devices to be anywhere within a particular building. In another embodiment, if augmented reality program 112 determined device location via GPS, then augmented reality program 112 determines whether more than one device is in the same location by comparing the GPS location of the devices. In a further embodiment, if augmented reality program 112 determined device location via receiving coordinates or an address from the devices, then augmented reality program 112 determines whether more than one device is in the same location by comparing the coordinates or addresses received from the devices.

If augmented reality program 112 determines more than one device is in the same location ("yes" branch, decision block 210), then augmented reality program 112 uploads a synchronized augmented reality data stream (step 212). In order to ensure that users within a pre-defined geographic location receive the same augmented reality data stream at the same time, augmented reality program 112 synchronizes the data stream upload to the devices. Augmented reality program 112 synchronizes the data stream upload to the devices using one of a plurality of techniques known in the art. For example, augmented reality program 112 may synchronize the data stream upload to the devices by uploading a complete augmented reality data set to the devices in which the data set has a pre-defined time or duration of time at which the scene or display changes, such as triggering an augmented reality dragon to appear in a room at precisely 2:00 p.m. In another example, augmented reality program 112 may synchronize the data stream upload to the devices by using techniques similar to known "just in time" (JIT) video streaming techniques to upload the augmented reality data stream to the devices. In a further example, augmented reality program 112 may synchronize the data stream upload to the devices by firing a trigger event to the devices at the same time, after augmented reality program 112 uploads the augmented reality data stream to the devices. In one embodiment, augmented reality program 112 uploads the synchronized augmented reality data stream immediately after determining more than one device is in the same location. In another embodiment, augmented reality program 112 may upload the synchronized augmented reality data stream at a pre-defined time or after a pre-defined duration of time after determining more than one device is in the same location.

Augmented reality program 112 uploads an augmented reality data stream to one or more devices based on the device location. If two or more users' devices, such as client computing device 104 and client computing device 108, are synchronized, then augmented reality program 112 uploads the same data stream at the same time to the synchronized devices such that augmented reality program 112 simulcasts the data stream to the devices. For example, if augmented reality program 112 is utilized in the location of a princess-themed birthday party, then augmented reality program 112 may upload an image of a dragon flying overhead to each of the devices in use at the party, such that each user sees the dragon at the same time the other users see the dragon, and the users can react to the image at the same time. In another example, if augmented reality program 112 is utilized in a store to advertise various items on sale, then augmented reality program 112 may upload an image of a sale banner in the aisle where the product on sale is located, and as each user enters the aisle, the image of the sale banner comes into view, such that users in the same aisle see the same image at the same time. In one embodiment, augmented reality program 112 may offer a user, via user interface 106, a selection of more than one augmented reality data streams from which to choose. For example, if augmented reality program 112 is utilized in a theme park, a user may choose age-appropriate content for augmented reality program 112 to upload to the user's device, such as a cartoon theme for younger users or a science fiction theme for adult users. In one embodiment, augmented reality program 112 uploads a static scenario where a user's device receives a complete data upload as the user arrives at a specified location. Augmented reality program 112 stores the upload on the user's device and activates the augmented reality data stream from the user's device. In another embodiment, augmented reality program 112 utilizes dynamic uploading and streaming to the user's device such that as a situation changes, augmented reality program 112 only sends a change to the previous upload, rather than sending the entire data set for each situation change, to preserve bandwidth. Augmented reality program 112 calculates, based on location, a quantity of data needed by the augmented reality device for the immediate vicinity of the device, thus optimizing the data stream.

If augmented reality program 112 determines more than one device is not in the same location ("no" branch, decision block 210), then augmented reality program 112 uploads an augmented reality data stream (step 214). As discussed with respect to step 212, augmented reality program 112 uploads the location based augmented reality data stream to the device using static or dynamic uploading techniques.

Augmented reality program 112 determines whether the user's device is in a different location (decision block 216). In order to deliver an augmented reality data stream that is relevant to a user's location, augmented reality program 112 monitors the location of users' devices to determine whether the user has moved into a different location in which the user may benefit from an augmented reality data stream that is different from the stream augmented reality program 112 is currently uploading. In this way, augmented reality program 112 can filter a list of augmented reality objects to display. In one embodiment, regions or locations corresponding to specific augmented reality streams are pre-defined and stored in database 114. Augmented reality program 112 determines when a user moves from one pre-defined region or location to another pre-defined region or location. If augmented reality program 112 determines the user is in a different location ("yes" branch, decision block 216), then augmented reality program 112 returns to step 208 to determine the user's new location.

If augmented reality program 112 determines the user is not in a different location ("no" branch, decision block 216), then augmented reality program 112 determines whether an exit notice is received (decision block 218). In one embodiment, when a user determines a point in time where the user wants to end the augmented reality data stream, the user may send, via user interface 106, an exit notice to augmented reality program 112. In another embodiment, augmented reality program 112 may prompt a user, via user interface 106, to choose whether to continue or end the augmented reality data stream. In a further embodiment, augmented reality program 112 may receive an exit notice when the user's device moves to a location that is outside of a location to which the augmented reality data stream corresponds.

If augmented reality program 112 determines an exit notice is not received ("no" branch, decision block 218), then augmented reality program 112 returns to step 210 in order to continue streaming augmented reality data to users in the same location. If augmented reality program 112 determines an exit notice is received ("yes" branch, decision block 218), then augmented reality program 112 discontinues the data stream upload and ends. In one embodiment, when augmented reality program 112 ends, augmented reality program 112 may send a message to the user to confirm the end of the data stream or to thank the user for participating.

Figure 3:
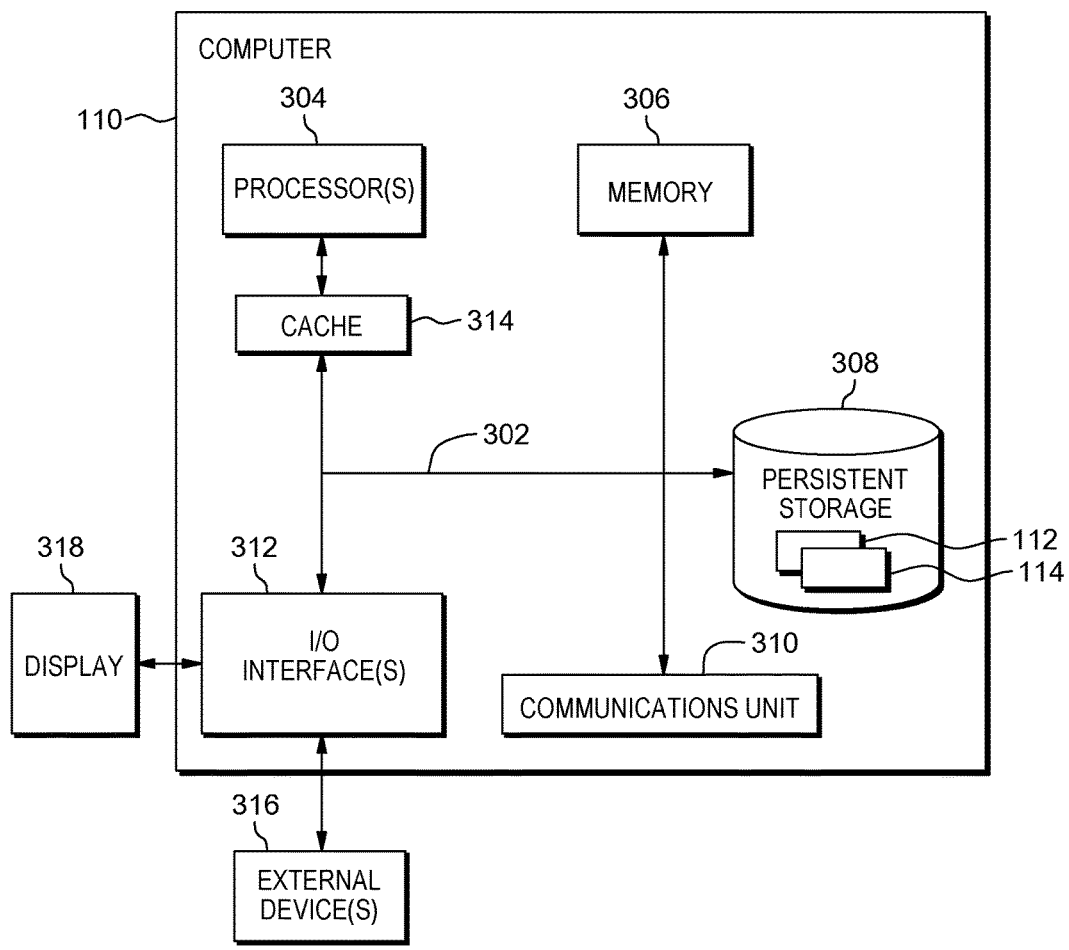
FIG. 3 depicts a block diagram of components of the server computer executing the augmented reality program within the augmented reality data processing environment of FIG. 1, in accordance with an embodiment of the present invention.

FIG. 3 depicts a block diagram of components of server computer 110 within augmented reality data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., augmented reality program 112 and database 114 are stored in persistent storage 308 for execution and/or access by one or more of the respective processor(s) 304 of server computer 110 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104 and client computing device 108. In these examples, communications unit 310 includes one or more network interface cards. Communications unit 310 may provide communications through the use of either or both physical and wireless communications links. Augmented reality program 112 and database 114 may be downloaded to persistent storage 308 of server computer 110 through communications unit 310.

I/O interface(s) 312 allows for input and output of data with other devices that may be connected to server computer 110. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., augmented reality program 112 and database 114 on server computer 110, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for location based augmented reality streaming, the method comprising:
    determining, by one or more computer processors, a first physical geographic location of one or more computing devices;
    determining, by the one or more computer processors, whether two or more of the one or more computing devices are within a pre-defined proximity threshold of each other in the first physical geographic location;
    responsive to determining two or more of the one or more computing devices are in the first physical geographic location, uploading, by the one or more computer processors, a first synchronized augmented reality data stream to the two or more computing devices in the first physical geographic location after a pre-defined duration of time, wherein augmented reality comprises a live view of a real world environment having contents that are supplemented by computer-generated sensory input;
    determining, by the one or more computer processors, the two or more computing devices move to a second physical geographic location;
    calculating, by the one or more computer processors, a quantity of data needed for a change of the first synchronized augmented reality data stream from the first physical geographic location to the second physical geographic location; and
    uploading, by the one or more computer processors, the calculated quantity of data needed for the change from the first synchronized augmented reality data stream to a second synchronized augmented reality data stream, wherein the uploaded quantity of data comprises the second synchronized augmented reality data stream associated with the second physical geographic location.

2. The method of claim 1, further comprising:
    broadcasting, by the one or more computer processors, a proximity based signal, wherein the proximity based signal is an advertisement of an augmented reality service; and
    determining, by the one or more computer processors, whether one or more users accept the proximity based signal via one or more computing devices.

3. The method of claim 2, further comprising, responsive to determining one or more users accept the proximity based signal, receiving, by the one or more computer processors, a registration notice from the one or more users that accepted the proximity based signal.

4. The method of claim 1, wherein uploading the first synchronized augmented reality data stream to the two or more computing devices in the first physical geographic location further comprises uploading, by the one or more computer processors, an augmented reality data stream to the two or more computing devices wherein the augmented reality data stream includes a pre-defined time at which a change is displayed.

5. The method of claim 1, further comprising:
    responsive to uploading the first synchronized augmented reality data stream to the two or more computing devices in the first physical geographic location, determining, by the one or more computer processors, whether one or more of the one or more computing devices is in a different location;
    responsive to determining one or more of the one or more computing devices is in a different location, determining, by the one or more computer processors, whether two or more of the one or more computing devices in the different location are in the same location; and
    responsive to determining two or more of the one or more computing devices are in the same location, uploading, by the one or more computer processors, a third synchronized augmented reality data stream to the two or more computing devices in the same location.

6. The method of claim 1, further comprising:
    determining, by the one or more computer processors, whether an exit notice is received from one or more users;
    responsive to determining an exit notice is received from the one or more users, discontinuing, by the one or more computer processors, uploading the first synchronized augmented reality data stream to the one or more computing devices; and sending, by the one or more computer processors, a message to the one or more users confirming an end to the first synchronized augmented reality data stream.

7. A computer program product for location based augmented reality streaming, the computer program product comprising:

one or more computer readable storage device and program instructions stored on the one or more computer readable storage device, the stored program instructions comprising:

program instructions to determine a first physical geographic location of one or more computing devices;

program instructions to determine whether two or more of the one or more computing devices are within a pre-defined proximity threshold of each other in the first physical geographic location;

responsive to determining two or more of the one or more computing devices are in the first physical geographic location, program instructions to upload a first synchronized augmented reality data stream to the two or more computing devices in the first physical geographic location after a pre-defined duration of time, wherein augmented reality comprises a live view of a real world environment having contents that are supplemented by computer-generated sensory input;

program instructions to determine the two or more computing devices move to a second physical geographic location;

program instructions to calculate a quantity of data needed for a change of the first synchronized augmented reality data stream from the first physical geographic location to the second physical geographic location; and program instructions to upload the calculated quantity of data needed for the change from the first synchronized augmented reality data stream to a second synchronized augmented reality data stream, wherein the uploaded quantity of data comprises the second synchronized augmented reality data stream associated with the second physical geographic location.

8. The computer program product of claim 7, the stored program instructions further comprising:

program instructions to broadcast the proximity based signal, wherein the proximity based signal is an advertisement of an augmented reality service; and program instructions to determine whether one or more users accept the proximity based signal via one or more computing devices.

9. The computer program product of claim 8, the stored program instructions further comprising, responsive to determining one or more users accept the proximity based signal, program instructions to receive a registration notice from the one or more users that accepted the proximity based signal.

10. The computer program product of claim 7, wherein the program instructions to upload the first synchronized augmented reality data stream to the two or more computing devices in the first physical geographic location further comprise program instructions to upload an augmented reality data stream to the two or more computing devices wherein the augmented reality data stream includes a pre-defined time at which a change is displayed.

11. The computer program product of claim 7, the stored program instructions further comprising:

responsive to uploading the first synchronized augmented reality data stream to the two or more computing devices in the first physical geographic location, program instructions to determine whether one or more of the one or more computing devices is in a different location;

responsive to determining one or more of the one or more computing devices is in a different location, program instructions to determine whether two or more of the one or more computing devices in the different location are in the same location; and responsive to determining two or more of the one or more computing devices are in the same location, program instructions to upload a third synchronized augmented reality data stream to the two or more computing devices in the same location.

12. The computer program product of claim 7, the stored program instructions further comprising:

program instructions to determine whether an exit notice is received from one or more users;

responsive to determining an exit notice is received from the one or more users, program instructions to discontinue uploading the first synchronized augmented reality data stream to the one or more computing devices; and program instructions to send a message to the one or more users confirming an end to the first synchronized augmented reality data stream.

13. A computer system for location based augmented reality streaming, the computer system comprising:

one or more computer processors;

one or more computer readable storage device;

program instructions stored on the one or more computer readable storage device for execution by at least one of the one or more computer processors, the stored program instructions comprising:

program instructions to determine a first geographic location of one or more computing devices;

program instructions to determine whether two or more of the one or more computing devices are within a pre-defined proximity threshold of each other in the first physical geographic location;

responsive to determining two or more of the one or more computing devices are in the first physical geographic location, program instructions to upload a first synchronized augmented reality data stream to the two or more computing devices in the first physical geographic location after a pre-defined duration of time, wherein augmented reality comprises a live view of a real world environment having contents that are supplemented by computer-generated sensory input;

program instructions to determine the two or more computing devices move to a second physical geographic location;

program instructions to calculate a quantity of data needed for a change of the first synchronized augmented reality data stream from the first physical geographic location to the second physical geographic location; and program instructions to upload the calculated quantity of data needed for the change from the first synchronized augmented reality data stream to a second synchronized augmented reality data stream, wherein the uploaded quantity of data comprises the second synchronized augmented reality data stream associated with the second physical geographic location.

14. The computer system of claim 13, the stored program instructions further comprising:
> program instructions to broadcast a proximity based signal, wherein the proximity based signal is an advertisement of an augmented reality service; and
> program instructions to determine whether one or more users accept the proximity based signal via one or more computing devices.

15. The computer system of claim 14, the stored program instructions further comprising, responsive to determining one or more users accept the proximity based signal, program instructions to receive a registration notice from the one or more users that accepted the proximity based signal.

16. The computer system of claim 13, wherein the program instructions to upload the first synchronized augmented reality data stream to the two or more computing devices in the first physical geographic location further comprise program instructions to upload an augmented reality data stream to the two or more computing devices wherein the augmented reality data stream includes a predefined time at which a change is displayed.

17. The computer system of claim 13, the stored program instructions further comprising:

> responsive to uploading the first synchronized augmented reality data stream to the two or more computing devices in the first physical geographic location, program instructions to determine whether one or more of the one or more computing devices is in a different location;

> responsive to determining one or more of the one or more computing devices is in a different location, program instructions to determine whether two or more of the one or more computing devices in the different location are in the same location; and > responsive to determining two or more of the one or more computing devices are in the same location, program instructions to upload a third synchronized augmented reality data stream to the two or more computing devices in the same location.

\* \* \* \* \*